Sept. 14, 1965 J. STREULE ETAL 3,205,544
CLOSING DEVICE FOR SHOES
Filed March 26, 1963 3 Sheets-Sheet 1
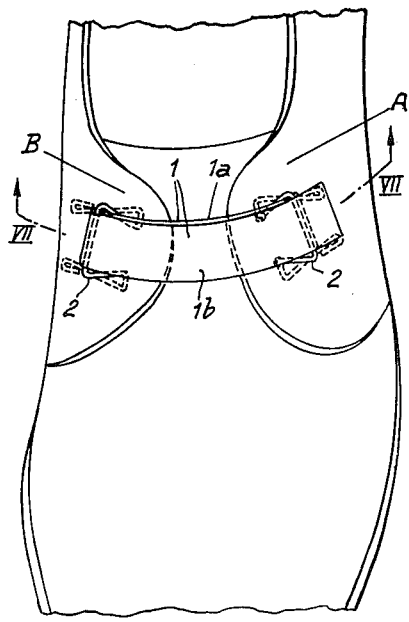
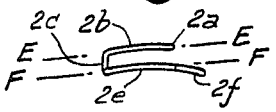
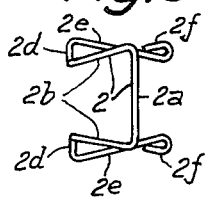
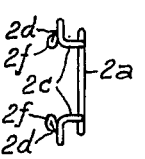
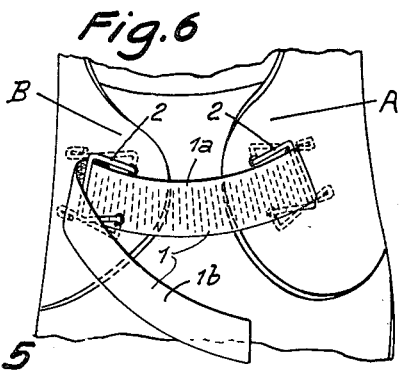
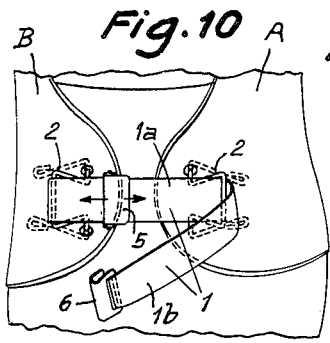
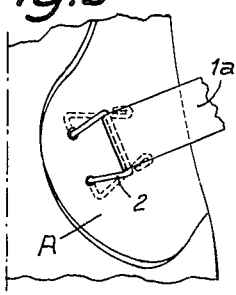
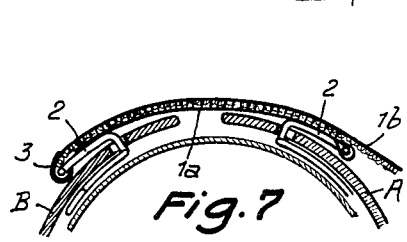
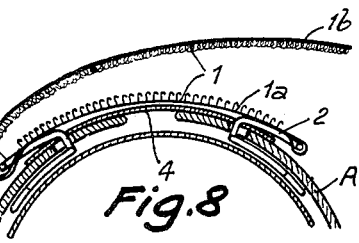
INVENTORS
J. Streule + B. Brot
BY Lowry & Rinehart
ATTORNEYS

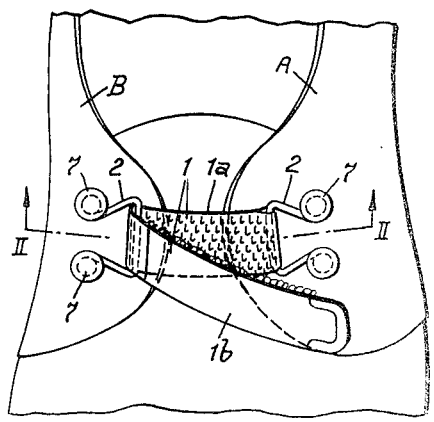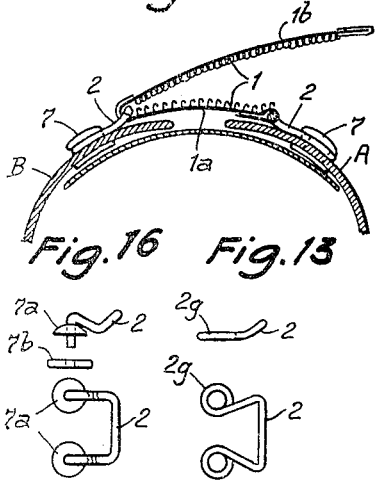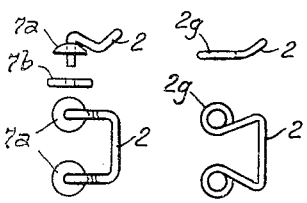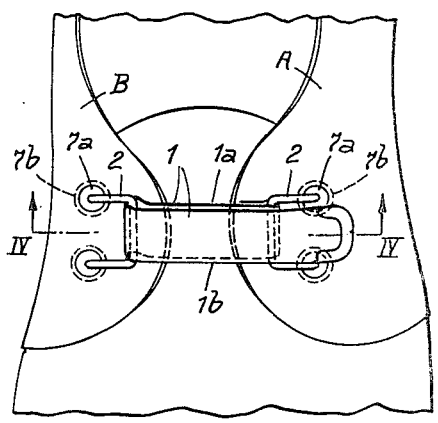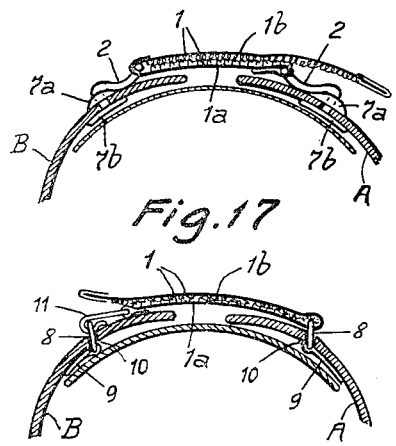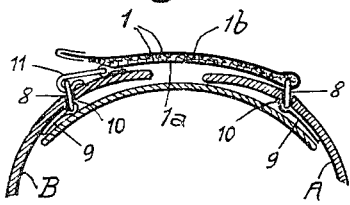
INVENTORS
J. Streule & B. Brot
BY Lowry & Rinehart
ATTORNEYS

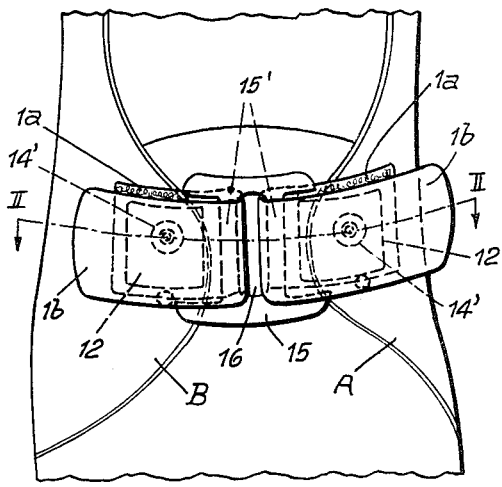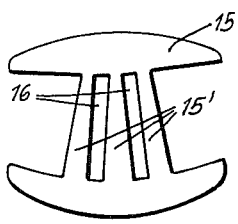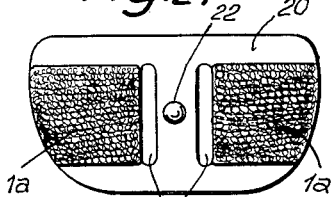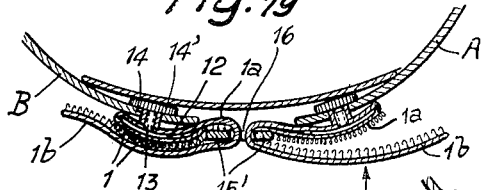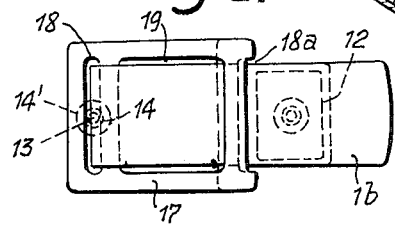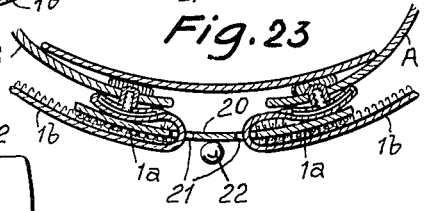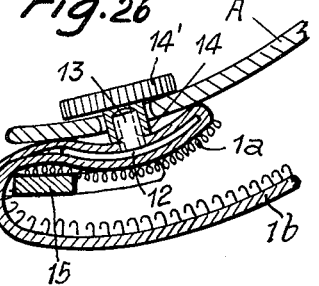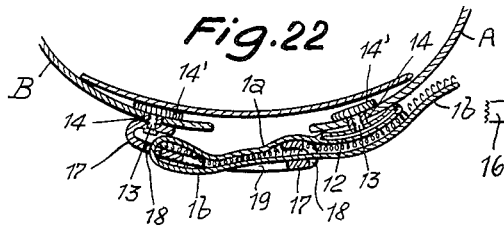

United States Patent Office 3,205,544
Patented Sept. 14, 1965

3,205,544
CLOSING DEVICE FOR SHOES
Josef Streule, untere Klus, Brulisau, Switzerland, and
Blasius Brot, Eichenstrasse 7, Sankt Gallen, Switzerland
Filed Mar. 26, 1963, Ser. No. 268,147
1 Claim. (Cl. 24—73)

Shoe closures are known in various constructions. Conventional are, in particular, lace and buckle connections. These, however, do not allow of an immediate connection, and also for disconnection various manual manipulations are required. On the other hand, adhering or clinging bands have been known of late years for closure connections in articles of clothing, which bands comprise hairlike interlocking elements. So far, such clinging bands have not been used for shoe closures.

Our present invention relates to a shoe closure which allows of a quicker and easier opening and closing of the shoes than has been possible so far by the provision of a connecting band passed looplike from one upper portion to the other upper portion and back again with two holding members or brackets disposed on the uppers and each having a cross-piece or web for engaging the connecting band.

In the drawing are shown examples of the invention.

FIG. 1 shows a partial view of a shoe provided with the closure means disclosed by the invention.

FIG. 2 is a side view of a clip,

FIG. 3 is a top plan view of FIG. 2,

FIG. 4 is an end view of the clip,

FIG. 5 shows a detail of FIG. 1,

FIG. 6 illustrates the closure in the open position,

FIG. 7 depicts a cross-section through the closure on the line VII—VII of FIG. 1, FIG. 8 shows a section through a second example of the closure, FIG. 9 depicts a modification of the clip for shoes comprising three eyelets in each upper, FIG. 10 illustrates a third example of the closure, FIG. 11 is a partial view of a shoe embodying a fourth example of the closure, in which the connecting strap is open, FIG. 12 is a cross-section through the closure means on the line II—II of FIG. 11, FIG. 13 shows the clip in side view and top plan view, FIG. 14 is a partial view of a shoe embodying a fifth example of the closure means, in which the connecting strap is closed, FIG. 15 is a cross-section through the closure on the line IV—IV in FIG. 14, FIG. 16 shows the clip and the appurtenant rivet parts, and FIG. 17 is a corresponding cross-section through a sixth form of the closure, FIG. 18 is a partial view of a shoe according to a seventh form of the invention, in closed condition, FIG. 19 shows a cross-section on the line II—II of FIG. 18, FIG. 20 depicts a detail variant pertaining to FIG. 18, FIG. 21 shows a view of the shoe closure according to an eighth form.

FIG. 22 illustrates the shoe closure of FIG. 21 disposed on the shoe, in section, FIG. 23 shows a ninth form of the shoe closure disposed on the shoe in cross-section, FIG. 24 is a view of the connecting member, FIG. 25 shows the latter in cross-section, and FIG. 26 is a partial section according to FIG. 19 in larger scale.

The shoe closure shown in FIGS. 1 to 7 comprises a clinging strap 1 and two clips 2 made of spring wire which for detachable fixation are insertable or, respectively, insterted in the lacing eyelets of the shoe upper A and B. The clinging band 1 comprises two parts 1a and 1b which are adheringly engageable to each other with their clinging surfaces and which at 3 (FIG. 7) are joined by sticking. The end of band part 1a is fixed to the cross-piece or web 2a of the clip 2 which is located on the upper portion A, while the clip 2 which is disposed on the upper B allows of a detachable connection to the band 1 by threading it through same. The band parts 1a, 1b are commercially obtainable. Band part 1a on its clinging side comprises as shown the hooked hairs which stand close together, and the band part 1b comprises the hair loops that also stand close together. The two band parts, however, may be interchanged. By pressing the band part 1a against the band part 1b, the two parts are engaged to each other in well known manner and are readily disengageable again. The clips 2, as seen from the side, are hook-shaped, as shown in FIG. 2. The web 2a with its legs 2b forms the clip proper and is situated on the outside of the upper portion A and B respectively. The crosspiece legs 2b through bends 2c standing at right angles to the clip plane E—E (FIG. 2) and subsequently through outwardly extending right-angle bends 2d are connected to plug-in legs 2e which extend in a direction opposite to the cross-piece legs 2b. The ends of the plug-in legs 2e are rounded so that they are readily introducible into the lacing eyelets of the uppers A and B. The legs 2e are situated in a plane F—F parallel to the plane E—E. The clip is made of steel-wire so that both the legs 2e and 2b spring towards each other. In this way the plug-in legs 2e can be readily introduced into the lacing eyelets of the uppers A and B. The clips allow a certain adaptation to the mutual spacing of the lacing eyelets. In the plugged position of the clip, the bends 2c thereof are positioned in the eyelets, while the legs 2e abut against the inside of the uppers and the clips proper 2a, 2b abut against the outside of the uppers, as shown in FIGS. 1 and 7.

When mounting the shoe closure described to the shoe uppers, first the clip 2 to which is attached one end of the clinging band, is plugged into the eyelets of the upper A so that the clip 2 is pointed outwardly, as shown in FIG. 1. Similarly, the clip 2 that is not connected to the clinging band, is plugged into the eyelets of the upper B. The band 1 then is passed from clip 2 of the upper A to the clip 2 of the upper B and threaded through same from the inside to the outside. By drawing-in the threaded band part 1b, the closure width may be regulated. Upon obtaining the desired closure width, the band part 1b is pressed against the band part 1a, whereby the closure is closed, as shown in FIGS. 1 and 7.

For shoes provided with three eyelets on each of the two uppers, conveniently broader clips are used, as shown in FIG. 9, so that the plugging clip legs are insertable into the first and third lacing eyelet of the respective upper A or B. In this way, the central lacing eyelet may be covered.

In the case of shoes provided with four lacing eyelets on each upper, two lacing closures may be applied.

In the second example of the shoe closure, shown in FIG. 8, the clips 2 are interconnected by an elastic band 4, the band ends being secured to the clip bands 2c. In this way, the elastic band is undetachably connected to the two clips but allows, thanks to its elastic extensibility, of an easy introduction and withdrawal of the wearer's foot after loosening the cling band 1.

The shoe closure shown in FIG. 10 comprises an elastic band 1 of which one end is hooked to clip 2 of upper B by means of a loop that is longitudinally adjustable on a buckle 5, and of which the other, free end is passed through clip 2 of upper A. The band-end passed through carries a hook-in member 6 with which it is hooked-in on clip 2 of upper B in easily detachable relation.

The example of the shoe closure shown in FIGS. 11 to 13 comprises a connecting band 1 of which one side is provided with clinging members, and two clips 2. The latter by means of rivets 7 are so secured to the uppers A and B that the clip-crosspieces face and are parallel to each other. The clips 2 are of U-shape and their legs comprise eyelets 2g with which the clips are secured to the upper by rivets 7. The clip legs further are bent so that the clip-crosspieces are spaced from the outside of the uppers. To the crosspiece of the clip 2 that is secured to upper A is attached one end of the connecting band 1. The latter is passed from upper A to upper B and back again to upper A through the clip secured to upper B. Band 1 comprises two parts 1a and 1b of which the former is provided with fine hair hooks while part 1b is provided with fine hair loops which as cling members are destined for mutual engagement. Band 1 is so arranged that the hair hooks are on the outwardly directed bandside of part 1a and the hair loops are on the inside of the returned band part 1b. In this way, the faces of the connecting band provided with clinging members are adjacent to each other so that when band part 1b is pressed against band part 1a, the desired adhesive connection of the two parts is effected.

The form of invention shown in FIGS. 14 to 16 differs from the one shown in FIGS. 11 to 13 solely by a different adaptation of the clips 2. In this form, the clip leg ends are bent off towards the uppers and pass through same. On the bent ends are mounted rivet heads 7a destined to engage the interior side of the upper and counter discs 7b destined to engage the exterior side of the upper, said discs being riveted to the latter. In this form also, the clip legs furthermore are bent so that the crosspiece is spaced from the exterior side of the upper whereby the connecting band is readily threadable therethrough.

In the form of invention shown in FIG. 17 the connecting band 1 is readily exchangeable or replaceable after pronounced wear or damage. To such end, eyelets 8 are provided on the uppers A and B, which are held by tabs 9. The latter are inserted in slots 10 of the uppers A and B and sewn on the inside to the upper A or B. The exchangeable connecting or adhering band 1 carries a hang-up hook 11 on the exterior end of one of its band parts 1a, which hook is hung up or engaged in the eyelet 8 secured to the upper B. In the closed position of the closure means, the other part 1b of band 1 is passed through the eyelet 8 attached to upper A, turned down and connected to band part 1a by pressing against same. By disengaging or unhooking hook 11, the adhering or clinging band may be removed again and replaced by a new band.

The shoe closure shown in FIGS. 18 to 20 and 26 comprises two holding elements that are to be secured to the uppers A and B respectively and which are provided with arched metal plates 12. The latter on their concave side carry a threaded stud 13 (FIG. 26) and on both sides are faced by portions of an adhering-band part 1a whereby the latter is fixed to the appurtenant holding plate 12. Band part 1a on one side is provided with a garniture or trimming formed of fine hairloops, and band part 1b is provided with a trimming formed little hooks or crochet of fine hair. Theaded stud 13 of the two holding plates 12 is plugged from the outside through an eyelet of upper A or B and secured by a nut 14 screwed on from the upper-inside and provided with a dog plate 14'. The band parts 1b of the two closure halves are threaded through an intermediate slotlike aperture 16 of a connecting member 15 which comprises two vertical webs 15' and is positioned between the uppers A and B, then turned outwardly and brought with its trimming into adhesive connection with the trimming of the band parts 1a. A portion of band part 1b may be threaded through aperture 16 of connecting member 15 to attain an adaptation of the closure-width to the requirements on hand.

FIG. 20 shows a variant of connecting member 15 that comprises two slotlike apertures 16 between three webs 15'. Said apertures slightly diverge downwardly and afford a better cross-position with respect to the direction of tension of the two adhering bands.

In the form of invention shown in FIGS. 21 and 22, one closure half portion on upper A is formed substantially similar to that of FIGS. 1 and 2, with the only difference that band 1a, 1b is longer than in the other closure half portion on upper B. The holding element of the other upper B comprises a plastic or metal plate 17 slotted at 18 and centrally at 19. The ends of plate 17 are bent inwardly through 180°, stud 13 and nut 14 being disposed on one of the two inwardly-bent edges. This type of closure is closed by threading band 1a, 1b from the inside of plate 17 through slot 18 from outside, then through central aperture 19 inwardly and through aperture 18a outwardly again, whereupon the adhering trimming of part 1a is combined with that of part 1b by pressing. The closure-width is regulable by threading the band part 1b in the desired length through aperture 18.

The shoe closure shown in FIGS. 23 to 25 differs from that shown in FIGS. 18 to 20 solely by the fact that the adhering band in each closure half portion is formed only of a part 1b. The connecting member 20 pertaining to the closure comprises a rigid metal or plastic plate that is provided with two slots 21 towards the centre. 22 is a pearl-like ornament. In this form of the invention, the closure assembly is closed by threading the bands 1b from inside to the outside through the slots 21 of member 20 and pressing same down on the band parts 1a of member 20.

The ends of the adhering bands may be riveted or sewn to the uppers A, B instead of being screwed thereto. Further, connecting member 15, 17 or 20 may be made of metal or plastic and possess inherent elasticity so as to fit the arch of the wearer's foot in order to avoid painful local pressure-spots.

The connecting member is disposed between the uppers A and B. When the adhering band has been threaded through the connecting member and turned over into the closure position, the tensile forces acting thereon are taken up by the connecting member at the points of deflection and reduced to a tolerable measure.

While the invention has been described in detail with respect to a now preferred example and embodment of the invention it will be understood by those skilled in the art after understanding the invention, that various changes and modifications may be made without departing from the spirit and scope of the invention and it is intended, therefore, to cover all such changes and modifications in the appended claim.

What we claim as new and desire to secure by Letters Patent, is:

Closing device for shoes for the adjustable connection of uppers provided with eyelets, comprising in combination at least two holding elements, one of each being connected detachably with one of the upper parts, each of said holding elements being provided with a web and an adjusting strap fastened with one extremity on one of the holding elements and arranged with its other extremity as a loop around the web of the neighboring holding element, said adjusting strap being provided in the overlapping range with facings of self-adhering fabrics on the surfaces facing each other, the two holding elements being in the form of brackets, each bracket including rigid bracket arms and resilient inserting arms disposed in a plane parallel to the plane of the bracket arms, perpendicular shoulders connecting the bracket arms and resilient inserting arms at corresponding ends thereof extending perpendicularly to the plane of the bracket arms, laterally angled shoulders adjacent said perpendicular shoulders, each rigid bracket arm with its web being disposed on the exterior side of the upper and the inserting arms on the interior side thereof, with the perpendicular shoulders extending perpendicularly to the plane of the bracket arms and retained in the eyelets in the upper parts.

References Cited by the Examiner

UNITED STATES PATENTS

| | | | |
|---|---|---|---|
| 471,919 | 3/92 | Walker. | |
| 583,564 | 6/97 | Benford. | |
| 807,527 | 12/05 | Wilson. | |
| 1,184,647 | 5/16 | Holloway | 24—201 |
| 1,271,259 | 7/18 | Auerbach | 24—203 |
| 1,348,703 | 8/20 | Ferris | 24—203 |
| 1,678,241 | 7/28 | Benz | 24—73.9 |
| 1,799,716 | 4/31 | White | 24—201.1 |
| 2,266,564 | 12/41 | McKinley | 24—198 |
| 2,719,903 | 10/55 | Lodenius | 24—73.1 |
| 2,904,294 | 9/59 | Marygold | 24—16 |
| 3,027,566 | 4/62 | Ruby | 24—205.13 |

DONLEY J. STOCKING, *Primary Examiner.*

BERNARD A. GELAK, *Examiner.*